United States Patent [19]

Conti et al.

[11] 4,153,291
[45] May 8, 1979

[54] VIEWPORT ASSEMBLY

[76] Inventors: Nicholas R. Conti, 34 Young Ave., Hillside, N.J. 07205; Robert Ferrara, 11 Preston Ave., East Hanover, N.J. 07936

[21] Appl. No.: 889,499

[22] Filed: Mar. 23, 1978

[51] Int. Cl.$^2$ .............................................. B60J 1/08
[52] U.S. Cl. ...................... 296/193; 296/191; 46/221; 180/69 R
[58] Field of Search ............................ 180/69 R, 69 C; 296/146, 2 BR, 28 CV; 52/204, 205, 208; 24/81 AG; 115/117; 46/39, 221, 222, 223, 1 R, 463; 49/465, 171

[56] References Cited

U.S. PATENT DOCUMENTS

| | | | |
|---|---|---|---|
| 2,240,586 | 5/1941 | Thompson | 296/28 R X |
| 2,726,482 | 12/1955 | Roehrl et al. | 46/39 X |
| 3,292,300 | 12/1966 | Lescher et al. | 46/39 |
| 3,583,513 | 6/1971 | Macadam | 180/69 R |
| 3,776,591 | 12/1973 | Krueger | 296/146 |
| 3,946,885 | 3/1976 | Menkel et al. | 296/28 X |
| 4,071,107 | 1/1978 | Leighty | 180/69 R |

Primary Examiner—Richard A. Bertsch
Assistant Examiner—Gene A. Church
Attorney, Agent, or Firm—Lerner, David, Littenberg & Samuel

[57] ABSTRACT

A veiwport assembly is provided for installation in the hood of a vehicle, the hood having an opening cut therein adapted to receive the viewport assembly. The viewport assembly includes a viewport having a central portion and a peripheral portion, with the viewport being of a size larger than the hood opening so that the peripheral portion of the viewport overlaps the peripheral edge of the hood opening. The overlapping portion of the viewport is provided with a tapered edge for engaging the uppersurface of the hood and for providing a smooth transition between the viewport and the hood. The viewport further includes a mounting member extending in a direction perpendicular to the viewport and extending from the viewport at a point between the peripheral and central portions thereof. The viewport assembly further includes lip means connected to the mounting member for engaging the underside of the hood to securely fasten the viewport within the hood opening. A number of alternative embodiments are disclosed in which the mounting member may be a snap-fit element, a U-shaped flange, or a clamp arrangement.

11 Claims, 5 Drawing Figures

VIEWPORT ASSEMBLY

FIELD OF THE INVENTION

The present invention relates generally to viewports for vehicles, and more particularly to a viewport assembly for installation in the front or rear hood of a vehicle, wherein the hood has an opening cut in it.

BACKGROUND OF THE INVENTION

In recent years, the customizing of vehicles has increased in interest. For example, it has become popular with vans to cut holes in the sidewalls and mount windows therein of any desired configuration. In addition, it has also become popular in automobiles to provide opera windows. For example, in U.S. Pat. No. 3,776,591, there is disclosed a method and apparatus for installing an opera window in the quarter panel of an automobile having an opening cut therein. Accordingly, it will be understood that there have been many attempts in the past to improve the appearance of vehicles, including providing them with distinctive as well as sporty features in order to enhance their appearance. It is therefore highly desirable to provide other arrangements for inexpensively enhancing the distinctiveness and/or the sportiness of vehicles.

Broadly, it is an object of the present invention to provide a viewport assembly which may be easily and inexpensively installed in the front or rear hood of a vehicle and thereby provide it with a distinctive and sporty feature to enhance the appearance of the vehicle.

It is a further object of the present invention to provide a viewport assembly which includes a viewport and means for easily and conveniently mounting the viewport in the hood opening of a vehicle with a smooth transition between the viewport and the hood.

SUMMARY OF THE INVENTION

Briefly, in accordance with the principles of the present invention, a viewport assembly is provided for installation in the front or rear hood of a vehicle, wherein the hood is provided with an opening cut therein adapted to receive the viewport assembly. The viewport assembly includes a viewport having a central portion and a peripheral portion, with the viewport being larger in size than the hood opening so that the peripheral portion of the viewport overlaps the peripheral edge of the hood opening. In addition, the overlapping portion of the viewport is provided with a tapered edge for engaging the uppersurface of the hood and for providing a smooth transition between the viewport and the hood. Further, the central portion of the viewport may be transparent so that the vehicle engine is visible, or it may be translucent. The viewport is also provided with a mounting member for mounting the viewport within the hood opening. In the preferred embodiment, the mounting member extends in a direction perpendicular to the plane of the viewport, and the mounting member extends from the viewport at a point between the peripheral and central portions thereof. Further, the viewport assembly includes lip means connected to the mounting member for engaging the underside of the hood to securely fasten the viewport within the hood opening.

In one embodiment, the mounting member and lip means of the viewport assembly take the form of a resilient, downwardly-extending member having a lip thereon, so that once the viewport is placed over the hood opening, it can be simply snapped in place so that the lip engages the underside of the hood and thereby securely fastens the viewport within the hood opening.

In alternative embodiments, the mounting member may include holes for fastening thereto lip means in the form of a metal or plastic strip which engages the underside of the vehicle hood to thereby securely fasten the viewport within the hood opening.

It should be understood that the hood of a vehicle may be located in either the front or the back of the vehicle, and that there would be a number of advantages in installing a viewport in accordance with the present invention in the hood of such a vehicle. More particularly, the viewport may take a variety of shapes and designs to further enhance the distinctiveness and appearance of the vehicle. In addition, as the viewport may be transparent, the vehicle owners are able to display the vehicle engines without the need of opening the vehicle hood. Accordingly, the distinctiveness of a vehicle can be greatly enhanced by installing a viewport assembly in accordance with the present invention, which is relatively easy and inexpensive to install.

It should also be understood that the viewport assembly of the present invention may be installed on any type of vehicle, including automobiles, vans, pickup trucks, jeeps, or the like, wherein the owner is desirous of providing a distinctive or sporty appearance to the vehicle. Further, the viewport can be made from plastic, safety glass, or any other suitable transparent, translucent, or opaque material. In addition, it should be understood that the viewport may be injection molded in the desired configuration, or manufactured in any other suitable manner.

A further advantage of the present invention resides in the fact that the viewport is provided with a tapered edge for engaging the uppersurface of the vehicle hood. In this manner, once the viewport is installed, no further touch-up work is necessary, and the tapered edge of the viewport provides a finished appearance and a smooth transition between the viewport and the hood. In addition, to further enhance the appearance of the viewport, lighting arrangements may be installed under the vehicle hood. More particularly, a series of lights can be installed under the hood about the periphery of the hood opening so that at night, the appearance of the viewport and engine is further enhanced.

Accordingly, as will be explained more fully herein, the viewport assembly of the present invention may be universally installed on any vehicle hood, it can be economically manufactured, and greatly enhances the distinctive appearance of the vehicle.

BRIEF DESCRIPTION OF THE DRAWINGS

Further objects, features, and advantages of the present invention will become apparent upon the consideration of the following detailed description of presently-preferred embodiments when taken in conjunction with the accompanying drawings, wherein.

DETAILED DISCUSSION OF PREFERRED EMBODIMENTS OF THE INVENTION

Figure 1:
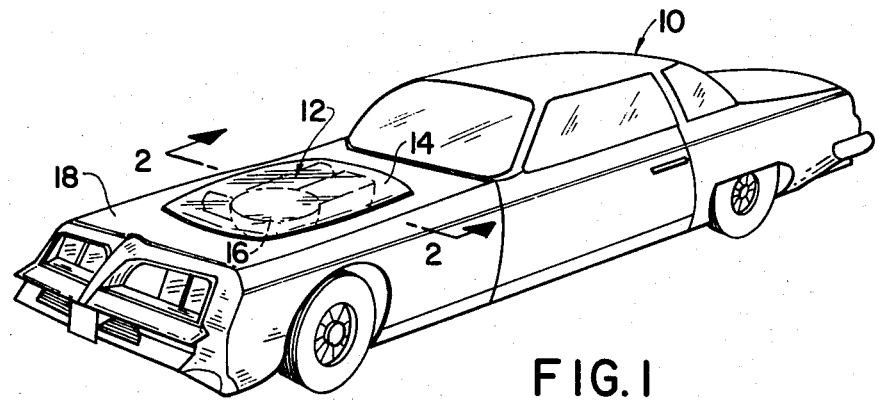
FIG. 1 is a perspective view of a vehicle, wherein the front hood thereof has been provided with a viewport assembly in accordance with the present invention.

Referring now to FIG. 1, there is shown a vehicle, generally designated by the reference numeral 10, which includes a viewport assembly 12 embodying the principles of the present invention. In this embodiment, the viewport assembly 12 includes a transparent viewport 14 so that the engine 16 of the vehicle is visible through the viewport 14. In this manner, it is not necessary to open the hood 18 of the vehicle in order to display the engine 16.

Figure 2:
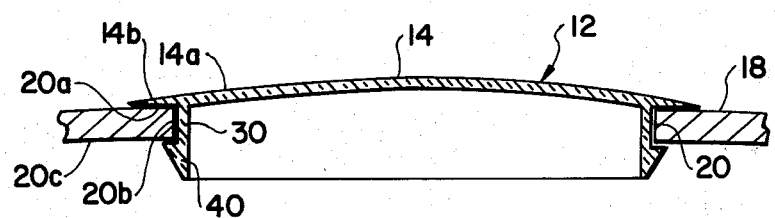
FIG. 2 is a cross-sectional view, taken on line 2—2 of FIG. 1, illustrating in detail the viewport assembly and the manner in which it is fastened to the vehicle hood.

As may be seen more clearly in FIG. 2, the vehicle hood 18 is provided with an opening 20 cut therein. It should be understood that hood opening 20 must be cut to match and be complementary to the viewport 14, which may have any desired configuration or shape. The viewport 14 includes a central portion 14a and a peripheral portion 14b, with at least the central portion being transparent. It should also be understood that the size of viewport 14 is such that it is slightly larger than hood opening 20, so that peripheral portion 14b overlaps the peripheral edge 20b of the hood opening around the entire periphery thereof. As will also be noted, the peripheral or overlapping portion 14b of the viewport is constructed to have a tapered edge for engaging the upper surface 20a of the vehicle hood. In this manner, the edge 14b tapers in thickness to meet the uppersurface 20a of the hood so that there is a smooth transition between the edge of the viewport 14 and the hood 18.

As stated above, at least the central portion 14a of the viewport is transparent, and of course, the entire viewport 14 can be transparent, if desired. Alternatively, the viewport may be translucent or opaque. In addition, the viewport 14 may be formed from any suitable material, such as plastic or safety glass. Also, the viewport 14 may be formed in any suitable manner, such as by an injection-molding process, or the like.

The viewport assembly 12 further includes means 30 for mounting the viewport within the hood opening 20. The mounting means 30 includes a member extending downwardly from the plane of the viewport and preferably extends in a direction substantially perpendicular to the viewport 14. As will be noted, mounting member 30 extends downwardly from the viewport at a point between the central portion 14a and the overlapping portion 14b thereof.

In addition, the viewport assembly 12 includes lip means 40 connected to mounting member 30 for engaging the undersurface 20c of hood 18 to fasten the viewport 14 within the hood opening 20. The lip means 40 includes a lip member which engages the undersurface of the hood. In this embodiment, it is preferably that mounting member 30 and lip member 40 be resilient and be integrally formed with viewport 14. In addition, it is also preferable that mounting member 30 and lip member 40 be continuous members and extend all the way around the periphery of the viewport 14. In this manner, the viewport assembly 12 is easy to install. It is only necessary to place the viewport 14 over the opening 20 cut in the hood 18 and then apply a downward force on the edges of the viewport 14 to snap continuous lip member 40 into engagement with the undersurface of hood 18. Of course, it will be understood that mounting member 30 and lip member 40 have a sufficient resiliency to be snapped in place in the manner described.

Figure 3:
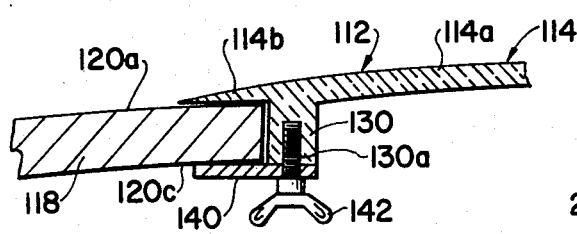
FIG. 3 is an alternative embodiment of a viewport assembly, wherein a clamping arrangement is provided to fasten the viewport to the hood.

Turning now to FIG. 3, an alternative embodiment of the present invention is illustrated. More particularly, viewport 114 has a central portion 114a and a peripheral or overlapping portion 114b which is tapered and engages the uppersurface 120a of vehicle hood 118. In addition, viewport assembly 112 is provided with a downwardly-extending mounting member 130 which extends downwardly from viewport 114 at a point between the central portion 114a and the peripheral portion 114b thereof. The mounting member 130 is provided with predrilled holes 130a at spaced intervals. In addition, it should also be understood that in this embodiment, mounting member 130 does not have to be continuous and extend about the entire periphery of the viewport 114. That is, a plurality of mounting members 130 can extend downwardly from viewport 114 at spaced intervals about the periphery of the viewport 114.

In addition, the embodiment shown in FIG. 3 is provided with lip means 140 for engaging the undersurface 120c of hood 118 to securely fasten the viewport 114 to the hood 118. The lip means 140 may take the form of a plastic or metal strip which follows the periphery of the hood opening and extends about the entire periphery thereof. Suitable fastening means, such as screws and wing nuts 142, are provided for fastening strip 140 to viewport 114 and are adapted to be received within predrilled holes 130a.

Figure 4:
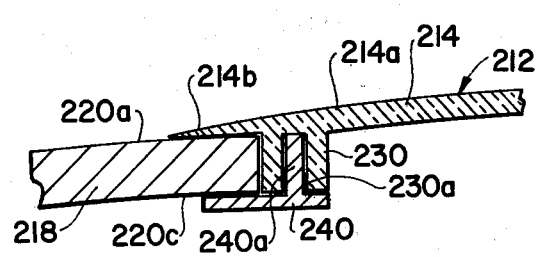
FIG. 4 is another alternative embodiment of a viewport assembly and the manner of fastening same to a vehicle hood.

Turning now to the embodiment shown in FIG. 4, the viewport assembly 212 includes viewport 214 having a central portion 214a and a peripheral or overlapping portion 214b, having a tapered edge for engaging the uppersurface 220a of the hood 218 of the vehicle. In addition, viewport assembly 212 includes downwardly-extending mounting member 230 having a plurality of preformed holes 230a at spaced intervals. It should be understood that mounting member 230 may be either continuous and extend about the entire periphery of the viewport, or mounting member 230 may be located at spaced intervals about the periphery of the viewport. In addition, the embodiment of FIG. 4 includes a lip member 240 for engaging the undersurface 220c of the hood 218 to fasten the viewport 214 to the hood. The lip member 240 is provided at spaced intervals with a plurality of upstanding legs 240a adapted to be snap-fit or press-fit into preformed openings 230a, so that viewport 214 may be securely fastened to the hood 218. In addition, it should be understood that lip member 240 may be a continuous member extending about the entire periphery of viewport 214, or alternatively, lip member 240 may include a plurality of sections located at spaced intervals about the periphery of the viewport for being snap-fit into the plurality of mounting members 230 located about the periphery of the viewport.

Figure 5:
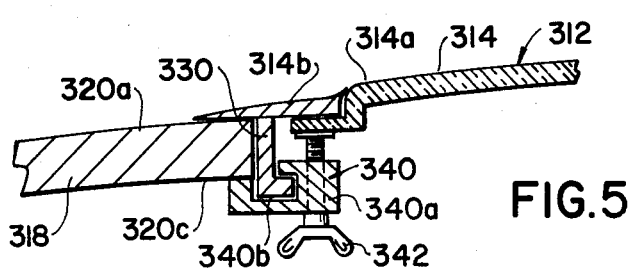
FIG. 5 is a further alternative embodiment of a viewport assembly in accordance with the present invention.

Turning now to the alternative embodiment illustrated in FIG. 5, the viewport assembly 312 includes a viewport 314 having a central portion 314a. In addition, the viewport includes a tapered rim portion 314b, one end of which engages the uppersurface of the viewport 314, and the other end of which engages the uppersurface 320a of the hood 318. It should be noted that rim portion 314b is a continuous member which extends about the entire periphery of the hood opening to overlap the viewport 314 and the hood 318 and thereby provides a finished appearance and a smooth transition between the viewport and the hood. In addition, the rim portion 314b may be formed of any suitable material, such as plastic or chrome, to provide an enhanced aesthetic appearance. Rim portion 314b also includes a plurality of L-shaped depending mounting members 330 at spaced intervals about the periphery of the hood opening. The viewport assembly 312 further includes lip means 340 which may be a continuous lip member extending about the periphery or be formed in a plurality of sections. In addition, lip member 340 includes a plurality of spaced-apart threaded openings 340a, each being adapted to receive a screw and wing nut 342 for engaging the undersurface of viewport 314. In addition, lip member 340 includes a plurality of recesses 340b adapted to receive L-shaped members 330. In this manner, when wing nuts and screws 342 are securely tightened, the viewport 314, the rim portion 314b, and the lip member 340 are all securely held together to fasten the viewport 314 relative to the hood 318.

It should also be understood that suitable lighting arrangements may be installed under the hood so that at night, the appearance of the viewport is further enhanced.

In view of the foregoing, it will be appreciated that there has been provided in accordance with the present invention a simple and inexpensive viewport assembly which may be easily installed in the front or rear hood of a vehicle. Further, at least the central portion of the viewport may be transparent, so that engine enthusiasts can display their engines without opening the hood. In addition, the viewport provides a distinctive and sporty appearance to the vehicle and greatly enhances its value.

A latitude of modification, change, and substitution is intended in the foregoing disclosure, and in some instances, some features of the invention will be employed without a corresponding use of other features. Accordingly, it is intended that the appended claims be construed broadly in a manner consistent with the spirit and scope of the invention herein.

What is claimed is:

1. A viewport assembly for installation in the front or rear hood of a vehicle, said hood having an opening cut therein, said viewport assembly comprising:

a viewport having a central portion and a peripheral portion, said viewport being of a size larger than said hood opening so that the peripheral portion of said viewport overlaps the peripheral edge of said hood opening, the overlapping portion of said viewport having a tapered edge for engaging the uppersurface of said hood and for providing a smooth transition between said viewport and said hood;

said viewport assembly further including means for mounting said viewport within said hood opening, said mounting means including a mounting member extending in a direction substantially perpendicular to said viewport and extending from said viewport at a point between the peripheral portion and the central portion thereof; and lip means connected to said mounting member and having a lip member for engaging the undersurface of said hood to securely fasten said viewport within said hood opening.

2. A viewport assembly in accordance with claim 1, wherein said mounting member and said lip member are integrally formed with said viewport and are resilient to form a snap-fit arrangement for engaging the undersurface of said hood.

3. A viewport assembly in accordance with claim 2, wherein said mounting member and said lip member extend continuously about the periphery of said viewport.

4. A viewport assembly in accordance with claim 1, wherein said mounting member and said lip member are fastened together by fastening means at spaced intervals about the periphery of said viewport.

5. A viewport assembly in accordance with claim 4, wherein said mounting means includes mounting members positioned at spaced intervals about the periphery of said viewport, and said lip member extends continuously about the periphery of said viewport.

6. A viewport assembly in accordance with claim 1, wherein said mounting means includes a plurality of preformed openings spaced about the periphery of said viewport, and said lip means includes a lip member and a plurality of legs depending therefrom and adapted to be snap-fit into said preformed openings to securely fasten said viewport within said hood opening.

7. A viewport assembly in accordance with claim 6, wherein said mounting means is integrally formed with said viewport, and said lip member extends continuously about the periphery of said viewport for engaging the undersurface of said hood.

8. A viewport assembly in accordance with claim 1, wherein the peripheral portion of said viewport in a separate member which defines a continuous rim adapted to overlap the edges of both said viewport and said hood.

9. A viewport assembly in accordance with claim 8, wherein said rim includes a plurality of spaced, L-shaped depending legs, and wherein said lip means includes a plurality of recesses for receiving said L-shaped legs.

10. A viewport assembly in accordance with claim 9, further including means for fastening said lip means and said rim portion to said viewport to securely fasten said viewport within said hood opening.

11. A viewport assembly in accordance with claim 1, wherein at least the central portion of said viewport is transparent.

* * * * *